UNITED STATES PATENT OFFICE 2,481,267

LOWER ALIPHATIC CARBOXYLIC ACID SALTS OF STREPTOTHRICIN AND STREPTOMYCIN

Alphonse Walti, Westfield, N. J., assignor to Merck & Co., Inc., Rahway, N. J., a corporation of New Jersey No Drawing. Application February 9, 1945, Serial No. 577,143

6 Claims. (Cl. 260—210)

This invention relates to antibiotic substances and particularly to water-soluble, basic, antibiotic substances obtained by cultivation of strains of microorganisms of the genus Actinomyces in suitable culture media.

It has been shown that antibiotic substances of this type such as streptothricin (Waksman and Woodruff; Proceedings of the Society for Experimental Biology and Medicine 49, 207–210 (1942) and streptomycin (Schatz, Bugie, and Waksman; Proceedings of the Society for Experimental Biology and Medicine 55, 66–69 (1944)) can be adsorbed from the culture broth by activated charcoal and then eluted from the charcoal by low normality alcoholic mineral acid. This acid must subsequently be neutralized by addition of alkali with the result that inorganic salts are formed which interfere with the isolation of streptothricin or streptomycin of high purity and therapeutic activity.

It has now been discovered, according to the present invention, that water-soluble, basic, antibiotic substances of the class described, after being adsorbed from culture broth by activated charcoal, can be eluted from the charcoal with a dilute solution of a lower aliphatic carboxylic acid in approximately 50% aqueous alcohol. The eluate thus obtained contains the corresponding lower aliphatic carboxylic acid salt of the antibiotic substance and some free acid. By then concentrating the eluate to small volume at reduced pressure the excess acid is distilled off, thereby obviating the necessity of neutralizing and thus introducing troublesome neutralization products.

When the eluate has been concentrated to about 0.1% of the volume of the broth used, two to five volumes (based upon the volume of concentrate) of alcohol are added causing a precipitate to form. Addition of acetone with agitation causes additional precipitate to form. The precipitate is centrifuged off, washed and triturated with alcohol and acetone, then washed with ether and dried.

The product thus obtained comprises essentially the lower aliphatic carboxylic acid salt of the antibiotic substance adsorbed from the broth, for example, the formate, acetate, or propionate salt of streptothricin, streptomycin or the like. These salts are white to greyish amorphous substances and are soluble in water. They are themselves useful as therapeutic agents and they can also be used as intermediates for preparing other substances of therapeutic value.

Regarded in certain of its broader aspects, the novel process according to this invention comprises adsorbing from culture broth a water-soluble, basic, antibiotic substance obtained by cultivating strains of microorganisms of the genus Actinomyces in a nutrient medium, eluting the adsorbate with a low normality aqueous-alcohol solution of a lower aliphatic carboxylic acid, and recovering from the eluate the corresponding lower aliphatic carboxylic acid salt of said antibiotic substance.

The following examples illustrate methods of carrying out the present invention but it is to be understood that these examples are given by way of illustration and not of limitation.

Example I

To about a liter of culture broth containing streptothricin, formed by the cultivation of a strain of the microorganism *Actinomyces lavendulae*, is added about 10 gm. of activated charcoal. The mixture is stirred for about an hour, and then filtered. The filter cake, comprising charcoal and adsorbed streptothricin, is suspended in about 100 cc. of 0.2N formic acid in 50% aqueous-methanol and stirred for about 4 hours at 45° C. The mixture is then filtered and the filter cake washed with about 20 cc. of 50% aqueous-methanol.

A straw-colored filtrate is obtained which is concentrated at reduced pressure and at a temperature of approximately 25° C. to about 1 cc. (0.1% of the volume of the broth used). About 4 cc. of methanol is added to the concentrate causing a precipitate to form. Without removing the precipitate about 3 cc. of acetone is added causing additional precipitate to form. The precipitate is centrifuged off, triturated with methanol and then acetone, washed with a small amount of 1:1 acetone-methanol and finally with ether.

The product, streptothrycin formate, is then dried in a desiccator. It is an amorphous solid, almost white (slightly greyish) in color, and is readily soluble in water. It has an antibiotic activity of approximately 82,000 units/gm. (A unit of activity is that amount of material which will inhibit the growth of a standard strain of *Esherichia coli* in 1 ml. of a suitable culture medium.)

Example II

To about a liter of culture broth containing streptomycin, formed by the cultivation of a strain of the microorganism *Actinomyces griseus*, is added about 10 gm. of activated charcoal. The mixture is stirred for about an hour and filtered. The charcoal adsorbate is then stirred for about an hour with about 100 cc. of 95% ethanol and filtered. (Tests of the spent broth and ethanol filtrates show no antibiotic activity.)

The charcoal adsorbate is then suspended in about 100 cc. of a solution of 0.2N formic acid in 50% aqueous-methanol and refluxed, with stirring, for about 4 hours. The mixture is then centrifuged and the charcoal cake washed with about 20 cc. of 50% aqueous-methanol. The eluate and aqueous-methanol wash are combined, concentrated under reduced pressure at about 50° C. to approximately 1 cc. (0.1% of the volume of broth used). Toward the end of the concentration a precipitate forms. About 2 cc. of methanol (anhydrous) is added causing additional precipitate to form. The aqueous methanol mixture is added dropwise to about 10 cc. of acetone, with stirring. A gummy precipitate forms and the acetone is separated by decanting. The precipitate is triturated with fresh acetone (about 10 cc.) until a pulverized solid remains. This is washed with ether and dried.

The slightly greyish, amorphous substance thus obtained is streptomycin formate. It is readily soluble in water and has an antibiotic activity of approximately 35,000 units/gm.

Example III

The process as set forth in Example I is repeated using a solution of 0.5N acetic acid in 50% aqueous-methanol (instead of formic acid) for elution. The amorphous, white to faintly greyish substance obtained is streptothricin acetate. It has an antibiotic activity of about 60,000 units/gm.

Example IV

The process as set forth in Example I is repeated using a solution of 0.2N propionic acid in 50% aqueous-methanol (instead of formic acid) for elution. The amorphous, slightly greyish substance obtained is streptothricin propionate. It has an antibiotic activity of about 50,000 units/gm.

It is to be understood that the activities given for the products in the foregoing examples are not to be considered as fixed values for the respective substances. The activity of the products vary from batch to batch depending, at least in part, upon the unit activity of the basic antibiotic substance in the broth that is used. The activity is given in the examples merely to indicate that the products have strong antibiotic activity.

In addition to the products of the several examples streptomycin acetate and streptomycin propionate as well as formate, acetate, and propionate salts of other water-soluble, basic Actinomyces elaboration products can be prepared in the manner described.

While the examples describe the use of 50% aqueous-methanol solution of a lower aliphatic carboxylic acid, other lower alcohols can be used, for example, a 50% aqueous-ethanol solution.

Modifications may be made in carrying out the present invention without departing from the spirit and scope thereof, and the invention is to be limited only by the appended claims.

What is claimed is:

1. The process that comprises adsorbing a substance selected from the class consisting of streptothricin and streptomycin from a culture broth containing the same, eluting the adsorbate with a low normality aqueous-alcohol solution of a lower alkyl carboxylic acid, concentrating the eluate by evaporation at reduced pressure, and recovering the corresponding lower alkyl carboxylic acid salt of said substance.

2. The process that comprises adsorbing streptothricin from a culture broth containing the same, eluting the adsorbate with a low normality aqueous-alcohol solution of a lower alkyl carboxylic acid, concentrating the eluate by evaporation at reduced pressure, and recovering the corresponding lower alkyl carboxylic acid salt of streptothricin.

3. The process that comprises adsorbing streptomycin from a culture broth containing the same, eluting the absorbate with a low normality aqueous-alcohol solution of a lower alkyl carboxylic acid, concentrating the eluate by evaporation at reduced pressure, and recovering the corresponding lower alkyl carboxylic acid salt of streptomycin.

4. The process that comprises adsorbing streptothricin from a culture broth containing the same, eluting the adsorbate with a low normality aqueous-methanol solution of formic acid, concentrating the eluate by evaporation at reduced pressure, and recovering streptothricin formate.

5. The process that comprises adsorbing streptothricin from a culture broth containing the same, eluting the adsorbate with a low normality aqueous-methanol solution of acetic acid, concentrating the eluate by evaporation at reduced pressure, and recovering streptothricin acetate.

6. The process that comprises adsorbing streptomycin from a culture broth containing the same, eluting the adsorbate with a low normality aqueous-methanol solution of formic acid, concentrating the eluate by evaporation at reduced pressure, and recovering streptomycin formate.

ALPHONSE WALTI.

REFERENCES CITED

The following references are of record in the file of this patent:

UNITED STATES PATENTS

| Number | Name | Date |
| --- | --- | --- |
| 2,378,449 | Tishler | June 19, 1945 |

OTHER REFERENCES

Proceedings of the Society for Experimental Biology and Medicine, volume 49, pages 207–210 (1942), volume 55, pages 66–69 (1944).

Journal Bacteriology, volume 46, pages 299–300 (Sept. 1943).